(12) United States Patent
Hill

(10) Patent No.: US 11,951,899 B1
(45) Date of Patent: Apr. 9, 2024

(54) ACCESSORY LIGHTS FOR A TWO-WHEELED VEHICLE

(71) Applicant: Stewart Laron Hill, McDonough, GA (US)

(72) Inventor: Stewart Laron Hill, McDonough, GA (US)

(*) Notice: Subject to any disclaimer, the term of this patent is extended or adjusted under 35 U.S.C. 154(b) by 0 days.

(21) Appl. No.: 18/117,098

(22) Filed: Mar. 3, 2023

Related U.S. Application Data

(60) Provisional application No. 63/316,362, filed on Mar. 3, 2022.

(51) Int. Cl.
*B60Q 1/04* (2006.01)
*B60Q 1/18* (2006.01)
*F21S 41/143* (2018.01)
*F21S 45/43* (2018.01)

(52) U.S. Cl.
CPC ............ *B60Q 1/0483* (2013.01); *B60Q 1/18* (2013.01); *F21S 41/143* (2018.01); *F21S 45/43* (2018.01)

(58) Field of Classification Search
CPC ......... B60Q 1/0483; B60Q 1/18; F21S 45/43; F21S 41/143
See application file for complete search history.

(56) References Cited

U.S. PATENT DOCUMENTS

| | | | |
|---|---|---|---|
| 5,791,760 A | 8/1998 | Scherbarth et al. | |
| 5,964,312 A | 10/1999 | Maldonado | |
| 6,595,666 B1 | 7/2003 | Exilien | |
| 6,863,425 B2 | 3/2005 | Hatfield, Jr. | |
| 7,055,993 B2 | 6/2006 | Farrow et al. | |
| 7,131,755 B1* | 11/2006 | Feng | B62J 11/19 362/549 |
| 7,264,076 B2* | 9/2007 | Grigg | B62J 6/027 180/219 |
| 8,317,377 B2* | 11/2012 | Hayakawa | B62J 6/02 180/218 |
| 8,550,673 B1 | 10/2013 | Jones, Jr. | |
| 2003/0142502 A1* | 7/2003 | Kawai | B62J 6/026 362/543 |
| 2007/0285935 A1* | 12/2007 | Thiers | B62J 6/055 362/476 |

(Continued)

FOREIGN PATENT DOCUMENTS

| | | |
|---|---|---|
| EP | 1473215 B1 | 3/2004 |
| EP | 2363320 A1 | 9/2011 |

*Primary Examiner* — Tracie Y Green
*Assistant Examiner* — Michael Chiang
(74) *Attorney, Agent, or Firm* — Bold IP, PLLC; Binita Singh

(57) ABSTRACT

One or more embodiments for an accessory light accessory is adapted to connect to a fork of a two-wheeled vehicle. A bracket is designed to be mounted on each side of a front wheel on the forks. The brackets can attach to at least one LED chip board which may connect to a control system on the handlebars or in an alternate location from the handlebars via wires. Concave glass lenses cover the LEDs to increase the angle of the emitted light for increased radius of light coverage. A heat sink fan with an associated motor is placed behind the LED lights to pull heat away from the LED lights. The LED lights and the heat sink fan include a cover having a sleek and aerodynamic design. A wind redirection plate is placed at a bottom of the cover to direct wind toward the LEDs to provide additional cooling.

21 Claims, 6 Drawing Sheets

(56) References Cited

U.S. PATENT DOCUMENTS

| | | | |
|---|---|---|---|
| 2008/0180962 A1* | 7/2008 | Edmond | B62J 6/045 |
| | | | 362/473 |
| 2009/0237231 A1* | 9/2009 | Osugi | B60Q 1/0088 |
| | | | 340/465 |
| 2020/0017164 A1 | 1/2020 | Saeki | |
| 2020/0039594 A1 | 2/2020 | Ebrahemi | |

* cited by examiner

ACCESSORY LIGHTS FOR A TWO-WHEELED VEHICLE

CROSS-REFERENCE TO RELATED APPLICATIONS

This application is a non-provisional application which claims priority to U.S. Provisional Application No. 63/316,362 filed on Mar. 3, 2022, which is incorporated by reference in its entirety.

FIELD OF THE INVENTION

The overall field of this invention is directed to a light system for a vehicle, and more particularly to an accessory light for a two-wheeled vehicle such as a motorcycle.

BACKGROUND

Mounted lights on two-wheeled vehicles such as motorcycles are important components to ensure safe operation and visibility to others. Aftermarket light packages are often equipped to motorcycles for an array of purposes. Some purposes may include enhanced aesthetics, improved illumination, and increased visibility to third parties. Additionally, these light packages often incorporate LED technology as the means for illumination in part, and non-comprehensibly, because of energy efficiency, their compact design, durability characteristics, and customization advantages. There are a variety of aftermarket light package designs currently available. Some incorporate LEDs as the illumination means and most designs, irrespective of the light emitting technology, typically go no further than merely providing illumination.

Thus, there still exists a need for such an improved device.

SUMMARY OF THE INVENTION

The present disclosure recognizes this unmet need for an improved device. A proposed solution to the otherwise one-dimensional options currently available is a compact and sleek light design incorporating various benefit adding components. This solution entails elements such as a sleek and aerodynamic housing, LED chip on board lights, heat sink fans, glass concave lenses, and a turning signal with switch back system integrated into the LED lights. None of the existing motorcycle light designs comprehensively incorporate the elements previously detailed, nor in the novel way that this invention combines them.

Other aspects and advantages of the present disclosure will become apparent upon consideration of the following description.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

DETAILED DESCRIPTION

Figure 1:
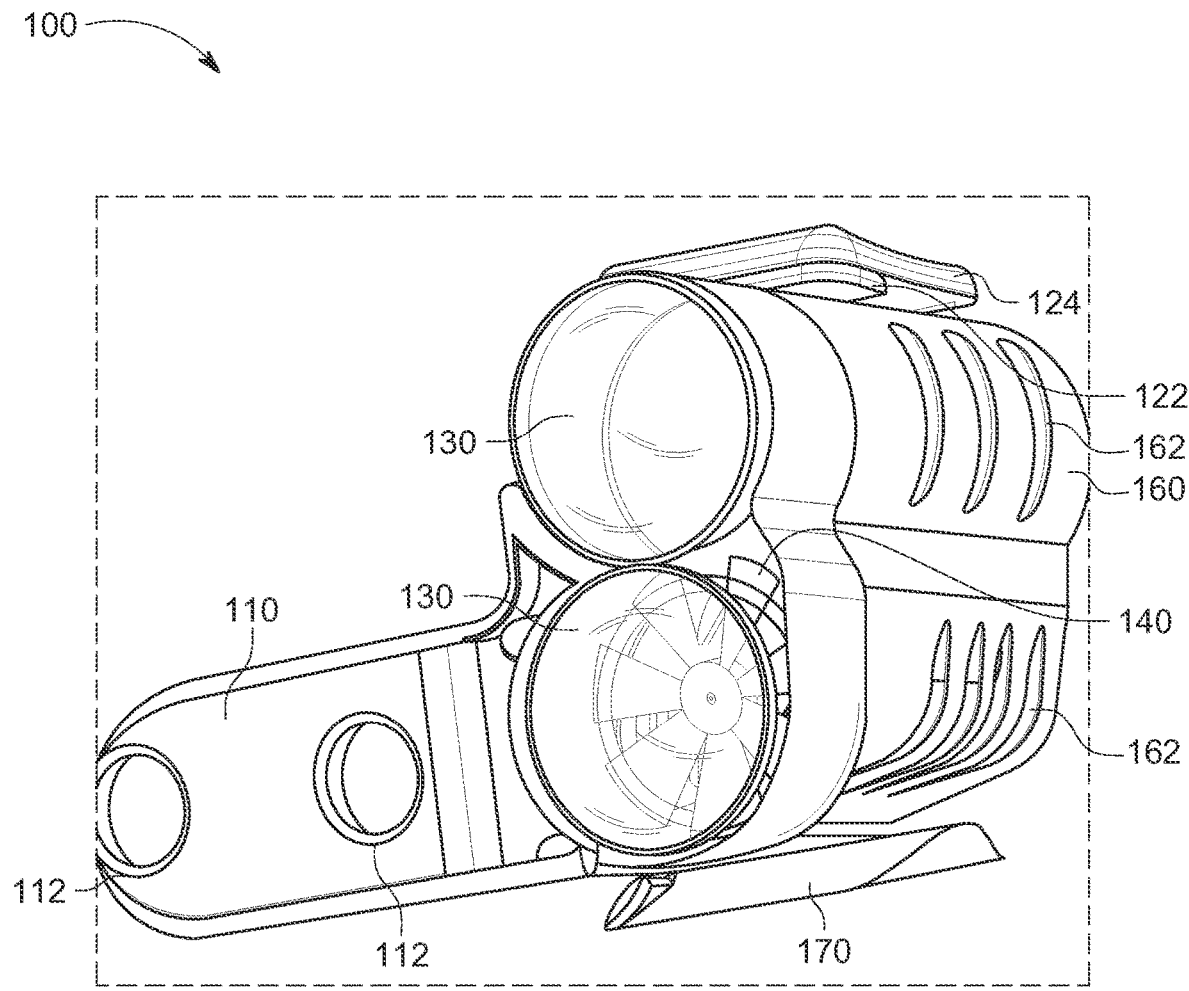
FIG. 1 is an illustration showing a perspective view of an exemplary light accessory with an associated cover.

In the Summary above and in this Detailed Description, and the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

"Exemplary" is used herein to mean "serving as an example, instance, or illustration." Any aspect described in this document as "exemplary" is not necessarily to be construed as preferred or advantageous over other aspects.

Throughout the drawings, like reference characters are used to designate like elements. As used herein, the term "coupled" or "coupling" may indicate a connection. The connection may be a direct or an indirect connection between one or more items. Further, the term "set" as used herein may denote one or more of any item(s), so a "set of items" may indicate the presence of only one item or may indicate more items. Thus, the term "set" may be equivalent to "one or more" as used herein.

The present disclosure recognizes the unsolved need for adjustable mount light accessory to illuminate and improve visibility of the ground immediately in front of and around the motorcycle. The light accessory device, as disclosed in one or more non-limiting embodiments, may be comprised of a bracket which is designed to be mounted on the side of motorcycle forks. In one or more embodiments of the light accessory, the illumination means may be comprised of LEDs, preferably of the Chip on Board (COB) LED design, which may further incorporate a turning signal with a switchback system. The LED lights may connect via a wire to a control system on the handlebars or in an alternate location from the handlebars. The light accessory device may also be comprised of two concave glass lenses which are placed over the LEDs. In one or more embodiments, one lens is for the light accessory and the second lens is for the turn signal with the lens further increasing the angle of the emitted light to increase the radius of light coverage. Additionally, the light accessory device may also be comprised of a heat sink fan which may preferably be placed behind the LED lights and mounted to the bracket to pull heat away from the LED lights. The LED lights and the heat sink fan may be assembled within a housing which may have a sleek, non-conspicuous, and aerodynamic design. A wind redirection plate may also comprise part of the light accessory and be configured to be placed under the housing to direct the wind into the housing to add another LED cooling feature to the light accessory.

One embodiment described herein includes a light accessory that is configured to mount to the sides of motorcycle forks. Specifically, the light accessory can mount onto the locknuts of the front axle. The bracket is designed to house high output Chip on Board (COB) LEDs and the heat sink fan connected to a motor. Other embodiments are also envisioned to be within the spirit of the invention as described herein. More details about these embodiments are included with reference to the Figures below.

Figure 2:
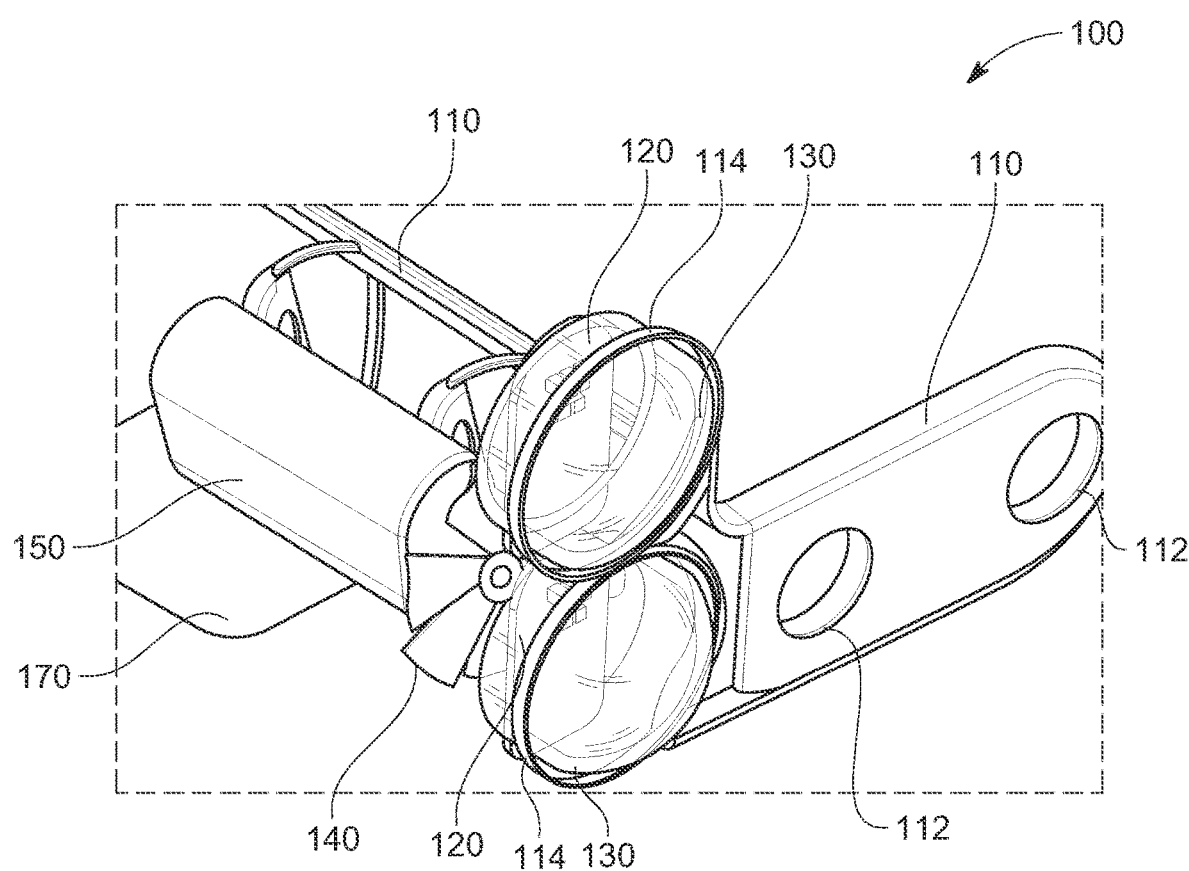
FIG. 2 is an illustration showing a side perspective view of the light accessory without the cover.
Figure 3:
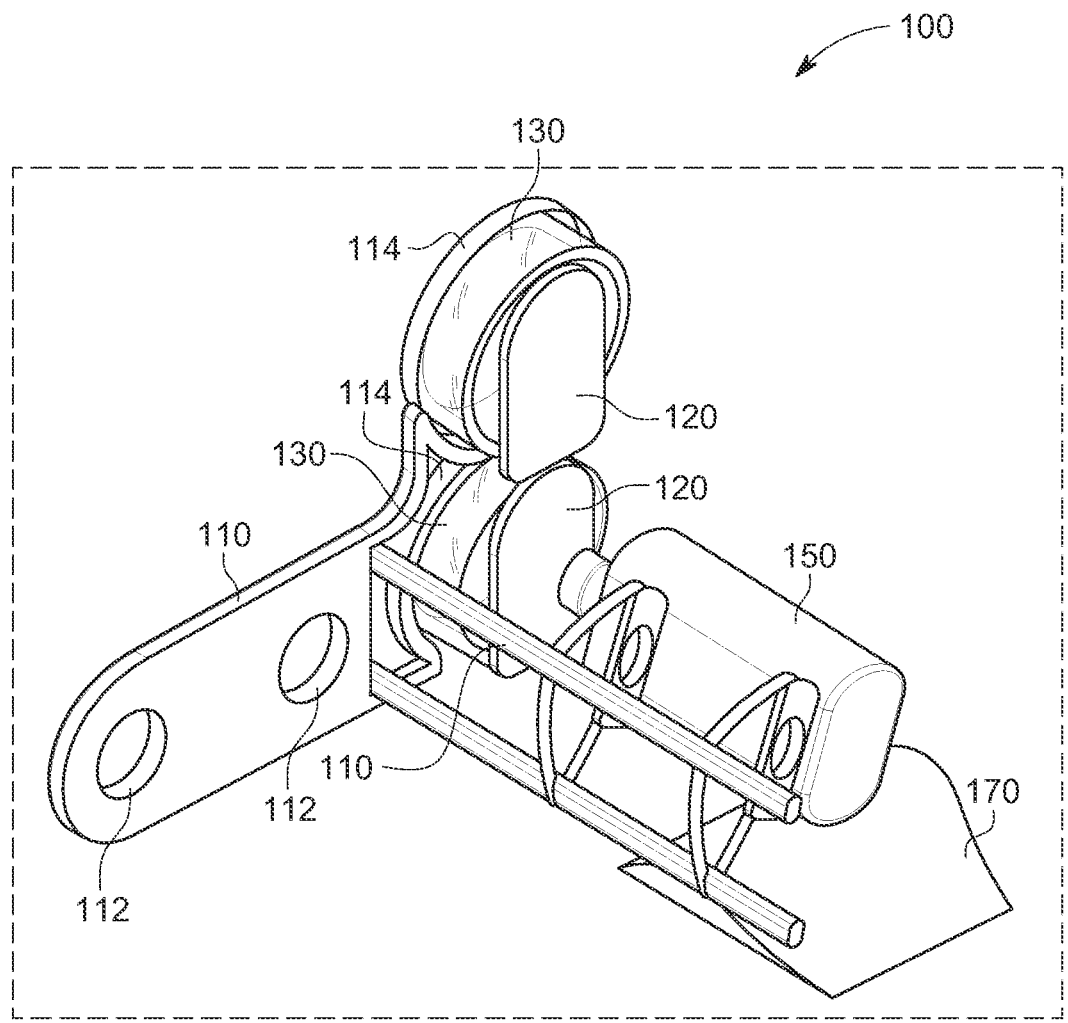
FIG. 3 is an illustration showing a perspective view of the back side of the light accessory without the cover and without a heat sink fan.
Figure 4:
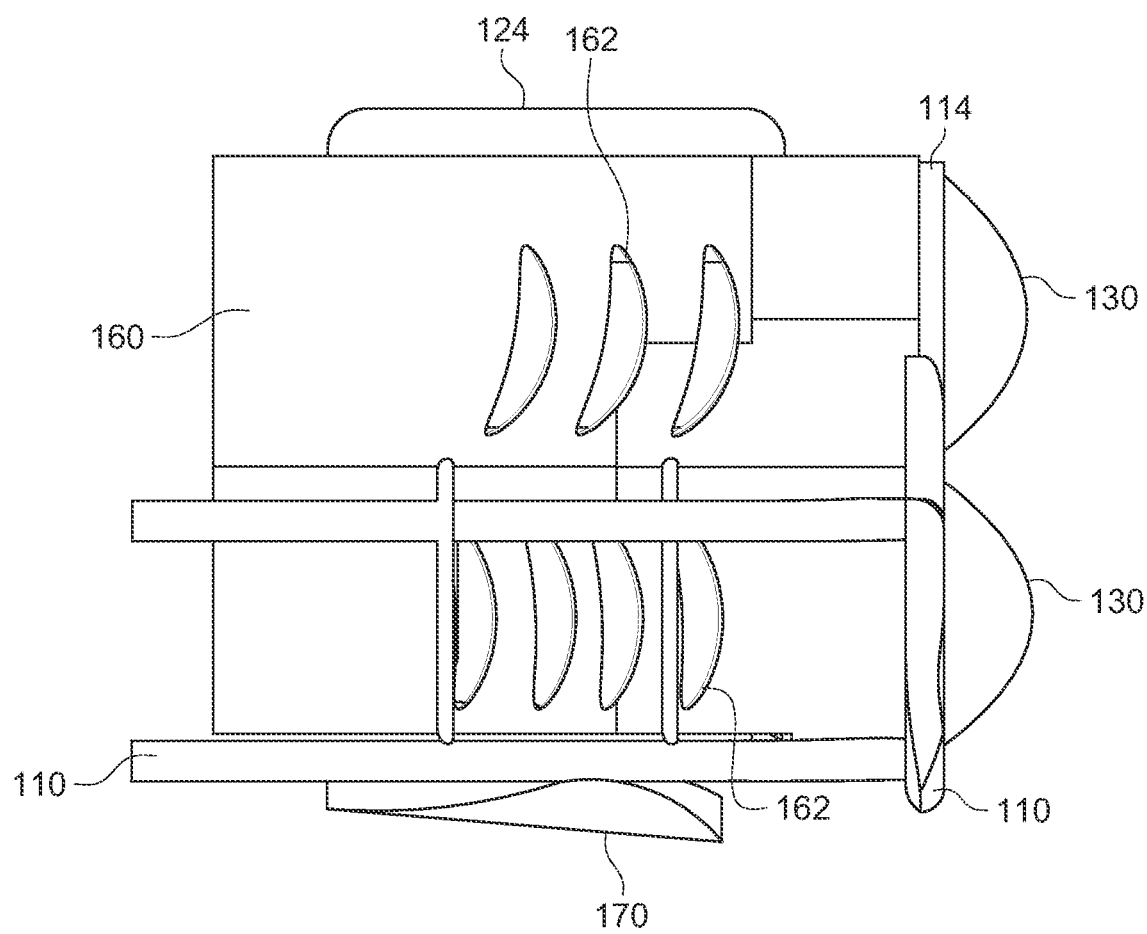
FIG. 4 is an illustration showing a side view of the light accessory with the cover.
Figure 5:
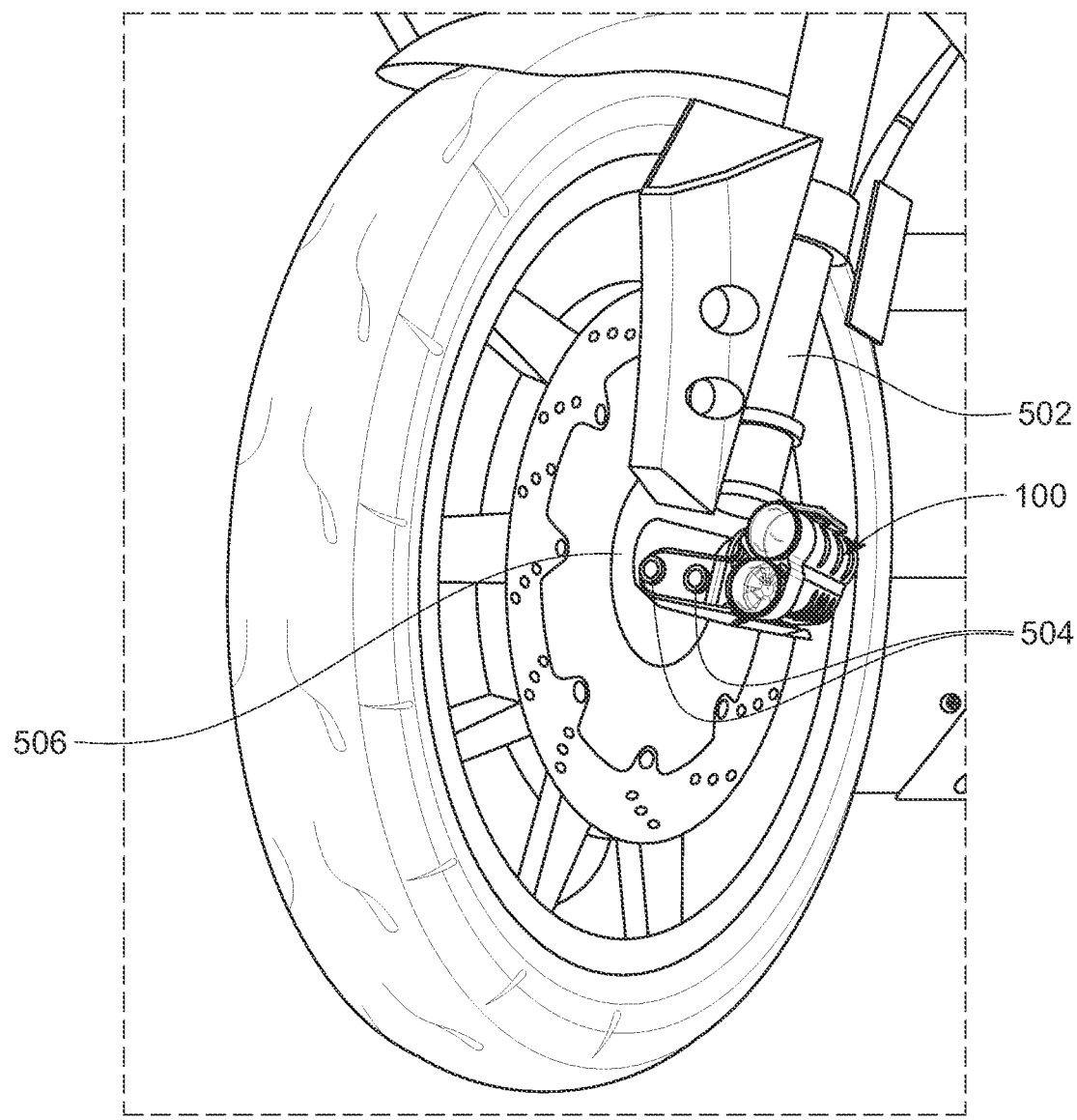
FIG. 5 is an illustration showing an environmental view of a light accessory mounted on a front fork of a motorcycle.

With reference now to FIGS. 1 to 4, an exemplary embodiment of a light accessory, such as light accessory 100, is shown. FIG. 1 shows a front perspective view of an assembled light accessory 100 which can be mounted on a left fork of a motorcycle (as shown in FIG. 5). FIG. 2 shows a front perspective view of a light accessory 100 which is arranged to be mounted on a right fork. The directions "left" and "right" are from the perspective of a rider on a motorcycle and not meant to be limiting in any form. Light accessory 100 is generally designed to be used with a two-wheeled vehicle, such as a motorcycle, and be mounted to the sides of a motorcycle fork (shown in FIG. 5). In particular, the light accessory 100 are appreciated to be used as a pair and to be mounted on locknuts of a front axle of the motorcycle fork, one on each side (a left and a right side). The pair of light accessories 100 are most beneficial in serving their purpose in this location. Light accessory 100 may be comprised of a bracket 110, a pair of LED chip boards 120 (see, FIG. 2 and FIG. 3), a pair of lenses 130 in front of the LED chip boards, a heat sink fan 140, a motor 150 (see, FIG. 2 and FIG. 3) to power the heat sink fan 140, a cover 160, and a wind redirection plate 170.

Bracket 110 of the light accessory 100 may be designed to be mounted on a left and a right side of a front wheel of a motorcycle. FIG. 5 illustrates that the bracket 110 may be mounted to a front fork 502 using one or more lock nuts 504 of a front axle 506. As noted in the above paragraph, the light accessory 100 is configured to be mounted on a front left fork and a front right fork of a motorcycle. FIG. 5 illustrates the front left fork 502 with a mounted light accessory 100. FIGS. 1 through 5 illustrate the bracket 110 with a configuration that allows the bracket 110 to be secured to the motorcycle fork using the lock nuts on a motorcycle. The bracket 110 is configured with two openings 112 such that the lock nuts 504 from the motorcycle may be placed through these openings 112 and secured to the fork 502 of the motorcycle on the front axle 506. The bracket 110 may be easily mounted to the fork 502 on the front axle 506 by first removing the lock nuts 504 and placing the openings 112 in the bracket 110 over the openings in the forks 502 from where the lock nuts 504 were removed. The bracket 110 may then be secured to the fork 502 of the motorcycle by replacing the lock nuts 504 through the openings 112. In alternative embodiments, the bracket 110 may be designed to accommodate differences in the fork designs of motorcycle and other two-wheeled vehicles which can benefit from using the light accessory 100.

In one or more embodiments, the bracket 110 provides a structure to incorporate the at least one LED chip board 120, the lenses 130, the heat sink fan 140, and the motor 150, and also provide a structure to attach the light accessory 100 to a fork of a motorcycle. The bracket 110 achieves this with a design that accommodates these features which comprise part of the light accessory 100. As mentioned in the above paragraph, the bracket 110 has opening 112 to accommodate the locknuts 504 to mount to the motorcycle fork 502. The bracket 110 has an L-shape wherein the openings 112 are on a section of the bracket 110 that is intended to face toward a front of a motorcycle and is relatively perpendicular to a section of the bracket 110 that connects to the motor 150. The motor 150 is on the section of the bracket 110 that is relatively parallel with a motorcycle when mounted onto the motorcycle. With respect to the materials used for the bracket 110, it is noted that bracket 110 may be formed from any suitable material. In one or more non-limiting embodiments, bracket 110 may be made of metal or any material known in the art. Preferably, the bracket 110 may be fashioned from stainless steel to maintain a sleek design.

Light accessory 100 is also comprised of at least one LED chip board 120. In FIG. 2 and FIG. 3, a preferred embodiment of the light accessory 100 illustrates a pair of LED chip boards 120 which are connected to a portion of the bracket 110 that allows the LEDs 120 to face toward a front and illuminate in front of a motorcycle when mounted on a motorcycle (as shown in FIG. 5). In one or more embodiments, the LED chip board 120 may be high output Chip on Board (COB) with a total of at least 6 chips. In an alternate embodiment, the light accessory 100 may be comprised of LED chip board 120 with at least 9 chips. The at least 6 or 9 chips on the LEDs function as the light accessory and the COB may also be comprised of an additional 3 chips which function as turn signals through a switch back system. It is also to be understood that if a pair of LED chip boards 120 are used, then a first LED chip board may function as a light accessory and a second LED chip board may function as the turn signal. Any combination of light arrangement is within this disclosure.

The light accessory 100 is also comprised of a buck converter 122 which converts or steps down a voltage of a given input to achieve a required output to the LEDs 120 and further allow the light accessory 100 to maintain the small and sleek design. The buck converter 122 may also be provided with a cover, referred to as a buck converter cover 124. The buck converter 122 may be placed anywhere close to the LEDs 120. As shown in FIG. 1, the buck converter 122 is located on the top of the light accessory 100, specifically on a top surface of the cover 160. In the non-limiting embodiments, the buck converter cover 124 may be fashioned from a metal, including and not limited to aluminum and stainless steel. It should be noted that other suitable means to power the LEDs that are known in the field may also be used.

The light accessory 100 also comprises one or more lenses 130. As shown in the Figures, each LED is covered by a lens 130. Essentially, the lenses 130 are equal in number to a number of LED chip boards 120 comprising the light accessory 100. The lenses 130 that comprise part of the light accessory 100 are categorized under diverging lenses, wherein the lenses are generally described as being thinner across the middle and thicker at the edges such that this geometry serves to diverge the light coming from the LEDs. These types of lenses may also be described as concave lenses. As illustrated in FIGS. 1 through 4, the lenses 130 are placed over the LEDs 120, such that the light from the LEDs 120 is channeled through the lenses 130 and is displaced to generate an illumination radius of at least 180 degrees. As seen in FIGS. 2 to 4, the section of the bracket 100 that includes the openings 112 for the locknuts 504 also includes one or more slots 114 to accommodate the one or more lenses 130. In the figures, there are two slots 114 and thus a pair of lenses, where one lens is fitted into each slot 114. Also note, in order to maintain a small profile and not project too much outward from the fork, the slots 114 are in line with each other and vertically connected. The two slots 114 are configured vertical to each other to align with a position of the two LED chip boards 120 such that the lenses 130 fitted in the slots 114 are directly in front of their respective LED chip board 120. That is a first lens 130 is in line with a first LED chip board 120 and a second lens 130 is in line with a second LED chip board 120.

Figure 6:
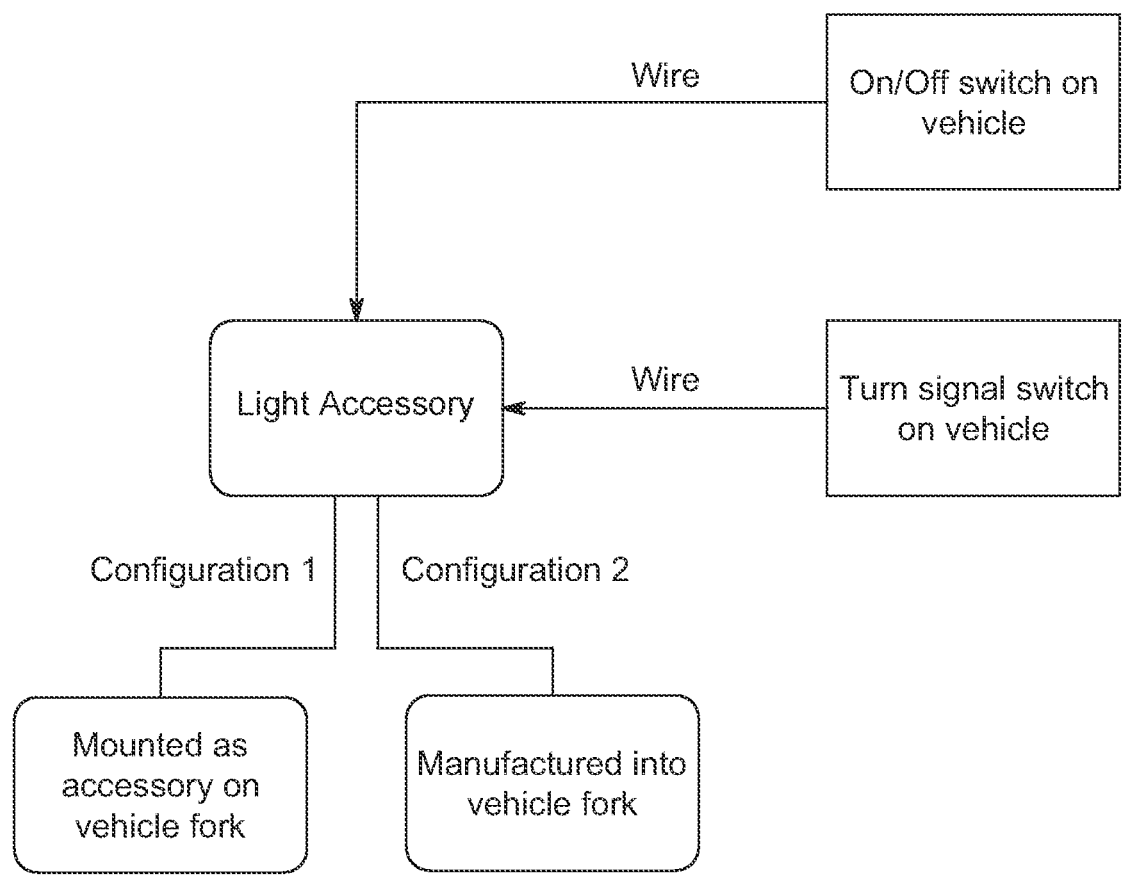
FIG. 6 is a block diagram illustrating a mechanism of controlling the light accessory.

Referring to FIG. 6, lights for the at least one LED chip board 120 may be controlled by a high-beam switch on a motorcycle handlebar. The at least one LED chip board 120 may be controlled by the high-beam switch through wires connected to a motorcycle headlight. Because the motorcycle headlight is also generally connected to and controlled by the high-beam switch on the motorcycle handlebar, wiring from the LEDs connecting to the headlight will allow the rider to control the light accessory 110. A turn signal switch on a motorcycle will also illuminate LEDs on the at least one LED chip board 120 that are for indicating a turn signal light on the light accessory 100. FIG. 6 also shows a configuration of the light accessory 100 that can be manufactured directly into a fork of a motorcycle or other two-wheeled vehicle. It is to be understood that that one or more LED chips boards can be configured into a fork during manufacturing of the fork. The control set up would be the same as wires would connect the at least one LED chip on each fork to the high beam switch and the turn signal switch on the motorcycle.

FIG. 1 and FIG. 2 also illustrate a heat sink fan 140, which may comprise part of the light accessory 100. The heat sink fan 140 is placed behind the at least one LED chip board 120 and is powered by a motor 150, such as and not limited to a 2600 RPM motor. The heat sink fan 140 serves the purpose of cooling and preventing the at least one LED chip board 120 in the light accessory 100 from overheating. When the at least one LED chip board 120 lights are running at full capacity or over an extended period of time, the LED chip board(s) 120 and the area around the LED chip boards(s) can get hot. Therefore, the heat sink fan 140 functions to keep the LED chip board(s) 120 and the area around the LEDs at an acceptable temperature by pushing the hot air away from the LEDs 120.

The heat sink fan 140 generally turns on when the at least one LED chip board 120 is on, and the motorcycle is stationary. When the motorcycle is moving, the heat sink fan 140 is off and the air flow is directed to the interior of the light accessory 100 by the wind redirection plate 170, which also comprises part of the light accessory 100. The wind redirection plate 170 is placed below the cover 160 and the at least one LED chip board 120 and is configured to direct the air toward the LEDs 120 to cool them down while the motorcycle is in motion. The heat sink fans 140 automatically turn on when the LEDs 120 and the area surrounding the LEDs heat up, which is generally the case when the motorcycle is not moving and the air is not flowing through to the LEDs 120. The wind redirection plate 170 may be fashioned from a suitable metal, such as and not limited to aluminum.

With reference to FIGS. 1 and 4, the light accessory 100 is also illustrated to be comprised of the cover 160. The cover 160 is designed to be placed over the at least one LED chip board 120, the heat sink fan 140, and the connected motor 150. In general, the cover 160 conceals and protects the LEDs 120, the wiring, the heat sink fan 140, and the motor 150 powering the heat sink fan 140. The cover 160 is designed to be aerodynamic and may include one or more vents 162 along its surface to augment the aerodynamic design of the cover 160 by permitting air flow through the cover 160. The cover 160 may be fashioned from a suitable metal material, such as and not limited to aluminum.

In other non-limiting embodiments and mentioned above in relation to FIG. 6, light accessory may be integrated directly onto the front fork of the motorcycle during the manufacturing process. It is also within the realm of this disclosure that the light accessory may be designed to be used with other two-wheeled vehicles such as, and not limited to, a bicycle, a scooter, and a moped. The light accessory may be designed to be mounted onto the fork of these and other two-wheeled vehicles or be integrated directly onto a fork during manufacturing.

Accordingly, the present description provides one or more embodiments for a useful light accessory with multiple benefits that can be mounted onto a two-wheeled vehicle. It may be an advantage of the light accessory, as described herein in one or more embodiments, that a rider is able to mount the pair of light accessories on the front forks of the two-wheeled vehicle, such as a motorcycle. The pair of exemplary light accessories mounted on the fork of the two-wheeled vehicle can move with the turning of a handlebar and illuminating the ground around the vehicle to provide better coverage and improve the visibility directly around the front of the motorcycle. The advantage being that the pair of mounted light accessories illuminate and improve coverage of an area that is not generally covered with the motorcycle headlight. Additionally, the exemplary light accessory has an aerodynamic design and is further designed to be small, sleek, and inconspicuous. In addition to the above, the exemplary light accessory is unique in that it provides significant safety benefits for people when riding their two-wheeled vehicle in limited daylight by allowing them to illuminate the area directly in front of the two-wheeled vehicle and in the direction they will be turning. Thus, the light accessory, as described in one or more non-limiting embodiments throughout this document, offers an improved method and device for illumination in conjunction with a headlight on a two-wheeled to improve visibility and thus increasing the safety to the rider.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention

What is claimed is:

1. A light accessory for a two-wheeled vehicle, the light accessory comprising:
    a bracket configured to be mounted on a front fork of a two-wheeled vehicle, the bracket further configured to connect to:
        at least one LED chip board;
        a glass lens placed in front of each of the at least one LED chip board;
        a heat sink fan mounted behind the at least one LED chip board;
        a motor connected to the heat sink fan; and
    a cover configured to be placed around the bracket covering the at least one LED chip board, the heat sink fan, and the motor.

2. The light accessory of claim 1 further comprising a wind redirection plate connected to a bottom portion of the bracket and placed outside the cover.

3. The light accessory of claim 1, wherein the bracket has one or more mounting holes, wherein each mounting hole of the one or more mounting holes accommodates a locknut to connect the bracket to the front fork at a front axle of the two-wheeled vehicle.

4. The light accessory of claim 1, wherein the cover has one or more vents.

5. The light accessory of claim 1, wherein the bracket has one or more slots to accommodate a lens in each slot of the one or more slots, wherein the one or more slots are equal in number to a number of the at least one LED chip board.

6. The light accessory of claim 5, wherein the lens in each slot of the one or more slots is in line with the at least one LED chip board.

7. The light accessory of claim 6, where each of the lenses is a dual glass lens having a concave structure.

8. The light accessory of claim 1 further comprising a buck convertor, wherein the buck convertor steps down voltage to the at least one LED chip board.

9. The light accessory of claim 8, wherein the buck convertor includes a buck convertor cover.

10. The light accessory of claim 8, wherein the buck convertor is connected to a top of the cover placed over the bracket.

11. The light accessory of claim 1, wherein the at least one LED chip board is connected to an existing high beam switch and an existing turn signal switch on the two-wheeled vehicle.

12. A light accessory for a two-wheeled vehicle, the light accessory comprising:
    a bracket configured to be mounted on a front fork of a two-wheeled vehicle, the bracket further configured to connect to:
        two LED chip boards, wherein a first LED chip board and a second LED chip board are vertically placed relative to each other;
        a pair of lenses covering a front of each of the first and second LED chip;
        a heat sink fan mounted behind the two LED chip boards;
        a motor connected to the heat sink fan; and
    a cover configured to be placed around the bracket covering the two LED chip boards, the heat sink fan, and the motor.

13. The light accessory of claim 12 further comprising a wind redirection plate connected to a bottom portion of the bracket and placed outside the cover.

14. The light accessory of claim 12, wherein the bracket has one or more mounting holes, wherein each mounting hole of the one or more mounting holes accommodates a locknut to connect the bracket to the front fork at a front axle of the two-wheeled vehicle.

15. The light accessory of claim 12, wherein the cover has one or more vents.

16. The light accessory of claim 12, wherein the bracket has two slots to accommodate the pair of lenses, wherein the two slots are configured vertical to each other to align with a position of the two LED chip boards such that a first lens is in line with the first LED chip board and a second lens is in line with the second LED chip board.

17. The light accessory of claim 16, where each of the lenses is a dual glass lens having a concave structure.

18. The light accessory of claim 12 further comprising a buck convertor having a buck cover, wherein the buck convertor steps down voltage to the at least one substrate with LED chips.

19. The light accessory of claim 18, wherein the buck convertor is connected to a top of the cover placed over the bracket.

20. The light accessory of claim 12, wherein the two LED chip boards are connected to an existing high beam switch and an existing turn signal switch of the two-wheeled vehicle.

21. A light accessory for a two-wheeled vehicle, the light accessory comprising:
    at least one LED chip board configured onto each of a front fork of a two-wheeled vehicle, wherein a light from the at least one LED chip board is directed in front of the two-wheeled vehicle; and
    wherein the at least one LED chip board is connected to an existing high beam switch and an existing turn signal switch of the two-wheeled vehicle.

* * * * *